US009922382B2

(12) United States Patent
Drefs et al.

(10) Patent No.: US 9,922,382 B2
(45) Date of Patent: Mar. 20, 2018

(54) TRAVEL RESERVATIONS USING A COMMON MODEL

(75) Inventors: Martin J. Drefs, Edina, MN (US); Jefferson Bridger Walsh, Sandy, UT (US)

(73) Assignee: NAVITAIRE LLC, Minneapolis, MN (US)

( * ) Notice: Subject to any disclaimer, the term of this patent is extended or adjusted under 35 U.S.C. 154(b) by 854 days.

(21) Appl. No.: 12/872,688

(22) Filed: Aug. 31, 2010

(65) Prior Publication Data

US 2011/0054957 A1  Mar. 3, 2011

Related U.S. Application Data

(60) Provisional application No. 61/238,442, filed on Aug. 31, 2009.

(51) Int. Cl.
*G06Q 50/14* (2012.01)
*G06Q 10/02* (2012.01)

(52) U.S. Cl.
CPC ............ *G06Q 50/14* (2013.01); *G06Q 10/02* (2013.01)

(58) Field of Classification Search
CPC ..................................................... G06Q 50/14
See application file for complete search history.

(56) References Cited

U.S. PATENT DOCUMENTS 5,570,283 A * 10/1996 Shoolery et al. ................. 705/5
5,634,053 A *  5/1997 Noble et al.
6,229,534 B1 *  5/2001 Gerra et al. .................. 715/733
6,457,009 B1 *  9/2002 Bollay .......................... 707/770
2002/0026443 A1 *  2/2002 Chang et al. .................. 707/10
2002/0156629 A1 * 10/2002 Carberry et al. ............. 704/257
2003/0144867 A1 *  7/2003 Campbell et al. ................ 705/1
2004/0010506 A1 *  1/2004 Wang ............................ 707/100
2005/0043974 A1 *  2/2005 Vassilev et al. ................. 705/5
2005/0086199 A1 *  4/2005 Champagne et al. ............ 707/1
2007/0100962 A1 *  5/2007 Barth et al. ................... 709/217

(Continued)

FOREIGN PATENT DOCUMENTS

WO      WO 00/52601      *  9/2000  ............. G06F 17/30
WO      WO 2007/115895 A2 * 10/2007  ............. G06Q 10/00

OTHER PUBLICATIONS

PR Newswire, "CheapoAir.com Launches Website That Offers Multi-Channel Lowest Fare Search and Booking Technology," PR Newswire Association LLC (Mar. 14, 2006).*

(Continued)

*Primary Examiner* — Nathan Erb
(74) *Attorney, Agent, or Firm* — Thompson Hine LLP

(57) ABSTRACT

A travel reservation system having a common object model for representing disparate travel products and services. In general, the system may provide efficient integration relationships between the travel reservation system and various third-party travel providers by using a single common model and interface structure, regardless of the type of product or service being offered. The system may include translators for converting travel products and services conforming to the common object model into a corresponding provider-specific model, and vice versa. In some implementations, the use of the common object model may allow the system to provide a set of query results covering multiple different product types in response to a single query input.

18 Claims, 11 Drawing Sheets

(56) References Cited

U.S. PATENT DOCUMENTS

2007/0124180 A1    5/2007  Takeuchi
2007/0299937 A1*  12/2007  Winter et al. ................. 709/219
2008/0168093 A1*   7/2008  De Marcken ............. 707/104.1
2009/0063559 A1*   3/2009  Rhodes et al. ............. 707/104.1
2010/0191553 A1*   7/2010  McIntosh et al. ................ 705/5

OTHER PUBLICATIONS

International Search Report and Written Opinion in Application No. PCT/US10/47325 dated Oct. 22, 2010, 6 pages.
International Preliminary Report on Patenability in Application No. PCT/US2010/047325 dated Mar. 15, 2012, 5 pages.
Gillmore, Office Action in co-pending Australian application No. 2010286418, dated Apr. 26, 2012 (2 pages).
Second Patent Examination Report for Australian Application No. 2010286418, dated Jan. 10, 2013, 2 pages.
Examination Report for Canadian Application No. 2,772,193, dated Nov. 10, 2014, 5 pages.

* cited by examiner

Product and Inventory/Rate Maintenance

Product Search

Code, Name, or Description:

Type: Please Select...

Provider:

Creation Date Range: 01Dec08 To 12Dec08

Culture Code:

☑ Include Inactive Products

[Search] [Clear]

Products

| Status | Code | Name | Type | Provider | Date Created | | | |
|--------|------|------|------|----------|--------------|---|---|---|
| Active | GOLD | Gold Travel Policy | INS | Primary Insurance (INS1) | 19Nov08 | | | |
| | | | | | | | | |
| | | | | | | | | |
| | | | | | | | | |

[Add Product] [Edit Product] [Delete Product] [Create Multiple Variations]

Product Variations for "GOLD"

| Variation ID | Name | External SKU Code | | |
|--------------|------|-------------------|---|---|
| GP1 | Gold 1 Day Policy | G1DAYADT | | |
| | | | | |
| | | | | |
| | | | | |

[Add Variation] [Edit Variation] [Delete Variation]

FIG. 5A

| Related Tasks |
|---|
| [***] Attribute Type Maintenance |
| [***] Provider Options |
| [***] Catalog Maintenance |
| [***] Season Maintenance |
| [***] Booking Source Maintenance |

Inventory/Rates                                                                                     Summary Note: An inventory needs to be created before a rate can be applied.

Inventory | Rates

View Inventory From: 23Jul08 [>]  To 20Aug08 [>]   View                       Bulk Edit

| Product Variations | Inventory | | July | | | | | | | | | | August | | | | | | | | | | |
|---|---|---|---|---|---|---|---|---|---|---|---|---|---|---|---|---|---|---|---|---|---|---|---|---|
| | | | 23 | 24 | 25 | 26 | 27 | 28 | 29 | 30 | 31 | 1 | 2 | 3 | 4 | 5 | 6 | 7 | 8 | 9 | 10 | 11 |
| Gold 1 Day Policy (GP1) | Cap | | 100 | 100 | 100 | 200 | 150 | 100 | 100 | 100 | 100 | 100 | 200 | 200 | 100 | 100 | 100 | 100 | 100 | 200 | 200 | 10 |
| | Sold | | 95 | 75 | 75 | 150 | 150 | 100 | 50 | 75 | 100 | 100 | 175 | 200 | | | | | | | | |
| | Remaining | | 5 | 25 | 25 | 50 | 0 | 0 | 50 | 25 | 0 | 0 | 25 | 0 | 100 | 100 | 100 | 100 | 100 | 200 | 200 | 10 |

FIG. 5A (Cont.)

InventoryRates

Note: An inventory needs to be created before a rate can be applied.

| Inventory | Rates | | | | | | | | | | | | | | | | | |
|---|---|---|---|---|---|---|---|---|---|---|---|---|---|---|---|---|---|---|

View Sellable Inventory From: 23Jul08 ▼  To: 31Jan09 ▼  Catalog: Internet (Default) (INT) ▼  View

*Enter 'FS' into the cell for free sale/unlimited inventory

| | | July | | | | | | | | | August | | |
|---|---|---|---|---|---|---|---|---|---|---|---|---|---|
| | | 23 | 24 | 25 | 26 | 27 | 28 | 29 | 30 | 31 | 1 | 2 | 3 | 2 |
| Gold 1 Day Policy (GP1) | Qty. For Sale | 100 | 100 | 100 | 100 | 100 | 100 | 100 | 100 | 100 | 100 | 100 | 100 | 100 |
| | Sold | 75 | 98 | 52 | 78 | 98 | 87 | 100 | 78 | 89 | 45 | 98 | 32 | 98 |
| | Remaining | 100 | 100 | 100 | 100 | 100 | 100 | 100 | 100 | 100 | 100 | 100 | 100 | 100 |
| | Base Price (USD) | 25.00 | 25.00 | 25.00 | 25.00 | 25.00 | 25.00 | 25.00 | 25.00 | 25.00 | 25.00 | 25.00 | 25.00 | 25.00 |
| | Display Price | 25.00 | 25.00 | 25.00 | 25.00 | 25.00 | 25.00 | 25.00 | 25.00 | 25.00 | 25.00 | 25.00 | 25.00 | 25.00 |
| Test Fee (TESTF) | Price | 10.00 | 10.00 | 10.00 | 10.00 | 10.00 | 10.00 | 10.00 | 10.00 | 10.00 | 10.00 | 10.00 | 10.00 | 10.00 |
| New Fee (NEWF) | Price | 10.00 | 10.00 | 10.00 | 10.00 | 10.00 | 10.00 | 10.00 | 10.00 | 10.00 | 10.00 | 10.00 | 10.00 | 10.00 |
| Fee 1 (FEE1) | Price | 10.00 | 10.00 | 10.00 | | | 10.00 | | | | 10.00 | | | |
| Fee 2 (FEE2) | Price | | | | | 10.00 | 10.00 | | | | | 10.00 | 10.00 | 10.00 |
| Breakfast (BKFT) | Price | 5.00 | 5.00 | 5.00 | 5.00 | 5.00 | 5.00 | 5.00 | 5.00 | 5.00 | 5.00 | 5.00 | 5.00 | 5.00 |

Summary

Bulk Edit Rate

Add Fee/Tax

Edit Fee/Tax

Delete Fee/Tax

Add Personalization

Edit Personalization

Delete Personalization

Inventory Summary

Search

View Inventory From: [23Jul08 ▼] To: [20Aug08 ▼]

[Search] [Clear]

Inventory Summary*

[Bulk Edit]

| Product Variation | | | July | | | | | | | | | | August | | | | | | | | | | |
|---|---|---|---|---|---|---|---|---|---|---|---|---|---|---|---|---|---|---|---|---|---|---|---|
| | | | 23 | 24 | 25 | 26 | 27 | 28 | 29 | 30 | 31 | 1 | 2 | 3 | 4 | 5 | 6 | 7 | 8 | 9 | 10 | 11 |
| Platinum Pass (PP) | Inventory | Cap | 100 | 100 | 100 | 200 | 150 | 100 | 100 | 100 | 100 | 100 | 200 | 200 | | 100 | 100 | 100 | 100 | 100 | 200 | 200 | 100 |
| | | Sold | 95 | 75 | 75 | 150 | 150 | 100 | 50 | 75 | 100 | 100 | 175 | 200 | | | | | | | | | |
| | | Remaining | 5 | 25 | 25 | 50 | 0 | 0 | 50 | 25 | 0 | 0 | 25 | 0 | | 100 | 100 | 100 | 100 | 100 | 200 | 200 | 100 |
| Gold Pass (GP) ▲ | Inventory | Cap | 100 | 100 | 100 | 200 | 150 | 100 | 100 | 100 | 100 | 100 | 200 | 200 | | 100 | 100 | 100 | 100 | 100 | 200 | 200 | 100 |
| | | Sold | 95 | 75 | 75 | 150 | 150 | 100 | 50 | 75 | 100 | 100 | 175 | 200 | | | | | | | | | |
| | | Remaining | 5 | 25 | 25 | 50 | 0 | 0 | 50 | 25 | 0 | 0 | 25 | 0 | | 100 | 100 | 100 | 100 | 100 | 200 | 200 | 100 |

Rate Summary*

* Enter 'FS' into the cell to indicate free sale/unlimited inventory.

[Bulk Edit]

| | | July | | | | | | | | | August | | | | |
|---|---|---|---|---|---|---|---|---|---|---|---|---|---|---|---|
| | | 23 | 24 | 25 | 26 | 27 | 28 | 29 | 30 | 31 | 1 | 2 | 3 | 4 | |
| Summer (SUM) | Qty. For Sale | 100 | 100 | 100 | 100 | 100 | 100 | 100 | 100 | 100 | 100 | 100 | 100 | 100 | |
| | Sold | 25 | 2 | 48 | 22 | 2 | 13 | 0 | 22 | 11 | 55 | 2 | 78 | 13 | |
| | Remaining | 75 | 98 | 52 | 78 | 98 | 87 | 100 | 78 | 89 | 45 | 98 | 32 | 87 | |
| | Base Price (USD) | 25.00 | 25.00 | 25.00 | 25.00 | 25.00 | 25.00 | 25.00 | 25.00 | 25.00 | 25.00 | 25.00 | 25.00 | 25.00 | |
| | Display Price | | | | | | | | | | | | | | |
| Spring (SPR) ▲ | Qty. For Sale | 100 | 100 | 100 | 100 | 100 | 100 | 100 | 100 | 100 | 100 | 100 | 100 | 100 | |
| | Sold | 25 | 2 | 48 | 22 | 2 | 13 | 0 | 22 | 11 | 55 | 2 | 78 | 13 | |
| | Remaining | 75 | 98 | 52 | 78 | 98 | 87 | 100 | 78 | 89 | 45 | 98 | 32 | 87 | |

FIG. 5D

| | | | | | | | | | | | | | | | |
|---|---|---|---|---|---|---|---|---|---|---|---|---|---|---|---|
| Winter (WIN) | Base Price (USD) | 25.00 | 25.00 | 25.00 | 25.00 | 25.00 | 25.00 | 25.00 | 25.00 | 25.00 | 25.00 | 25.00 | 25.00 | 25.00 | 25.00 |
| | Display Price | 25.00 | 25.00 | 25.00 | 25.00 | 25.00 | 25.00 | 25.00 | 25.00 | 25.00 | 25.00 | 25.00 | 25.00 | 25.00 | 25.00 |
| | Qty. For Sale | 100 | 100 | 100 | 100 | 100 | 100 | 100 | 100 | 100 | 100 | 100 | 100 | 100 | 100 |
| | Sold | 25 | 2 | 48 | 22 | 2 | 13 | 0 | 22 | 11 | 55 | 2 | 78 | 32 | 13 |
| | Remaining | 75 | 98 | 52 | 78 | 98 | 87 | 100 | 78 | 89 | 45 | 98 | 32 | 78 | 87 |
| Fall (FAL) | Base Price (USD) | 25.00 | 25.00 | 25.00 | 25.00 | 25.00 | 25.00 | 25.00 | 25.00 | 25.00 | 25.00 | 25.00 | 25.00 | 25.00 | 25.00 |
| | Display Price | 25.00 | FS | FS | FS | FS | FS | FS | FS | FS | 25.00 | 25.00 | 25.00 | 25.00 | 25.00 |
| | Qty. For Sale | 100 | 100 | 100 | 100 | 100 | 100 | 100 | 100 | 100 | 100 | 100 | 100 | 100 | 100 |
| | Sold | 25 | 2 | 48 | 22 | 2 | 13 | 0 | 22 | 11 | 55 | 2 | 78 | 32 | 13 |
| | Remaining | FS | FS | FS | FS | FS | FS | FS | FS | FS | 45 | 98 | 32 | 78 | 87 |
| | Base Price (USD) | 25.00 | 25.00 | 25.00 | 25.00 | 25.00 | 25.00 | 25.00 | 25.00 | 25.00 | 25.00 | 25.00 | 25.00 | 25.00 | 25.00 |
| | Display Price | 25.00 | 25.00 | 25.00 | 25.00 | 25.00 | 25.00 | 25.00 | 25.00 | 25.00 | 25.00 | 25.00 | 25.00 | 25.00 | 25.00 |

FIG. 5D (Cont.)

TRAVEL RESERVATIONS USING A COMMON MODEL

CROSS-REFERENCE TO RELATED APPLICATION

This application claims priority to and the benefit of U.S. Provisional Patent Application No. 61/238,442, filed Aug. 31, 2009 and titled "Travel Reservations Using a Common Model."

TECHNICAL FIELD

This document relates to systems and techniques for reservations of travel-related products and services using a common model.

BACKGROUND

The travel industry includes many different segments of travel providers. Some examples of travel industry segments include airlines, hotels, car rental companies, activity providers, insurance providers, and the like. Each of the travel providers in these industry segments may typically offer multiple different products and/or services to their customers—e.g., hotels may offer many different types of rooms, car rental companies may provide several different classes or types of cars, etc.

Oftentimes, a customer purchasing one travel-related product may be interested in purchasing additional related products or services. For example, when a customer purchases a flight for a business trip, the customer might also need a hotel room at the travel destination and/or a rental car during the trip. Rather than dealing with each of the travel providers individually, customers may prefer a one-stop shopping experience that allows them to purchase the travel products using a single interface.

This one-stop shopping experience may be provided, for example, via travel consolidators that aggregate different products from different travel providers and segments, or via provider alliances who have agreed to work with one another to allow access to each others' reservation systems. However, setting up either of these options may involve significant integration efforts on the part of the travel providers or consolidators because each of the different travel providers may have their own interfaces and product models that are specific to their particular business. As such, even relatively minor changes in product definitions or interfaces may result in a substantial amount of work to ensure that all of the various components are able to properly communicate with one another in a language that both sides can understand.

SUMMARY

This document describes systems and techniques related to a travel reservation system having a common object model for representing disparate travel products and services. In general, the system may provide efficient integration relationships between the travel reservation system and various third-party travel providers by using a single common model and interface structure, regardless of the type of product or service being offered. The system may include translators for converting travel products and services conforming to the common object model into a corresponding provider-specific model, and vice versa. In some implementations, the use of the common object model may allow the system to provide a set of query results covering multiple different product types in response to a single query input.

In one general aspect, a computer-implemented method includes receiving an item availability request from a first travel item provider, the availability request including one or more criteria describing types of items that are requested, transmitting queries to other travel item providers requesting information regarding available items that satisfy the one or more criteria, receiving information from the other travel item providers regarding available travel items that satisfy the one or more criteria, and transmitting the information to the first travel item provider.

Implementations can include one or more of the following features, For example, the item availability request is generated in response to a query received from a user requesting a first type of product. The item availability request includes criteria describing products of the first type of product. The information regarding the available travel items that satisfy the one or more criteria includes information regarding items of different item types. The method can include translating, by one or more computer processors, the criteria describing the types of items that are requested to provider-specific criteria to create the queries to other travel item providers.

In another general aspect, a system includes one or more receivers receiving item availability requests from travel item providers, the item availability requests including one or more criteria describing types of items that are requested, and receiving information from travel item providers regarding available travel items that satisfy the one or more criteria of the item availability requests, one or more processors translating information in a provider-specific format to information in a common format, and one or more transmitters transmitting queries to travel item providers requesting information regarding available items that satisfy the one or more criteria of the item availability requests and transmitting the information regarding available travel items that satisfy the one or more criteria of the item availability requests.

Implementations can include one or more of the following features. For example, the item availability request is generated in response to a query received from a user requesting a first type of product. The item availability request includes criteria describing products of the first type of product. The information regarding the available travel items that satisfy the one or more criteria includes information regarding items of different item types.

The details of one or more implementations are set forth in the accompanying drawings and the description below. Other features and advantages will be apparent from the description and drawings, and from the claims.

DESCRIPTION OF DRAWINGS

Figure 5C:
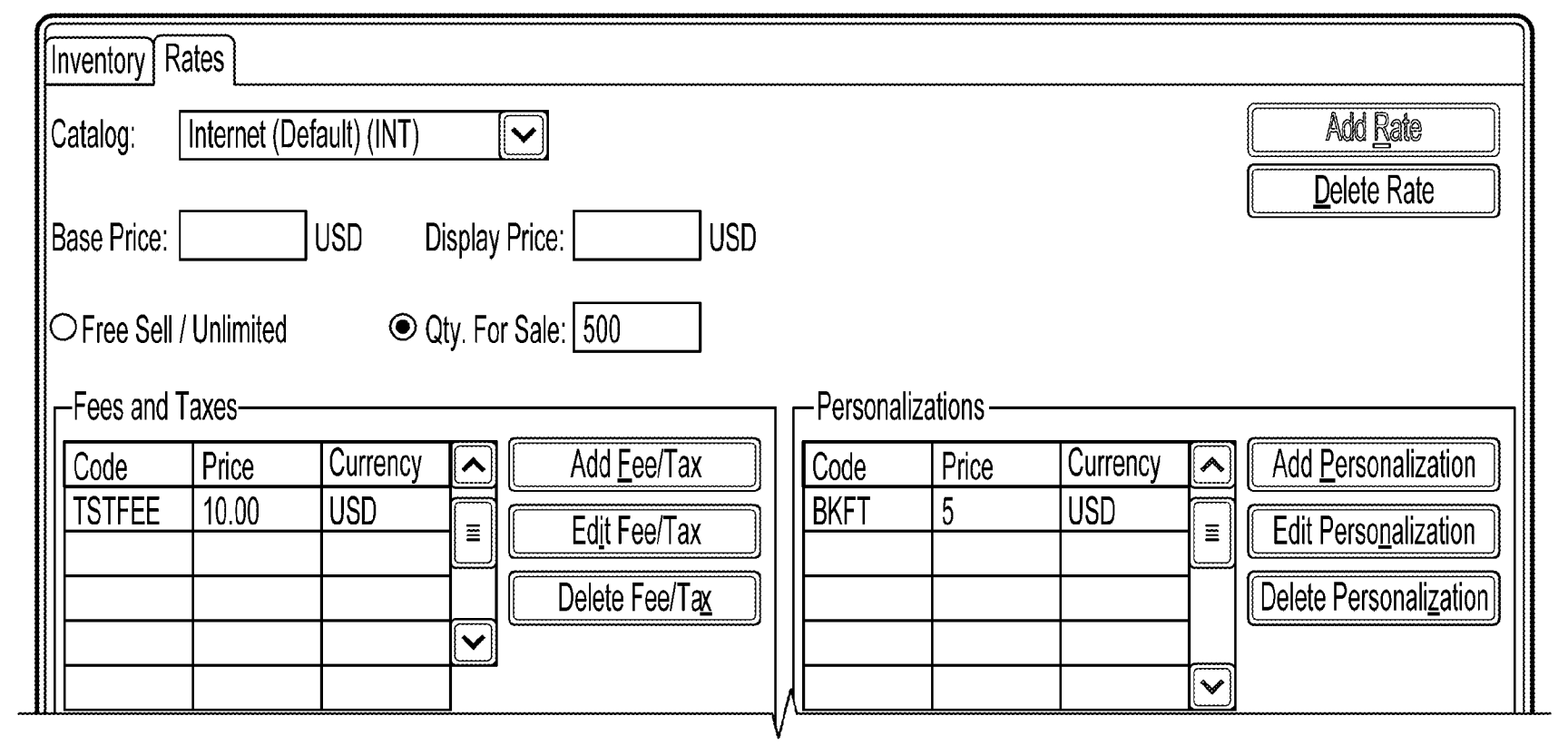

FIGS. 5A-5D are example screen shots of a user interface for maintaining travel products.

Like reference symbols in the various drawings indicate like elements.

DETAILED DESCRIPTION

This document describes systems and techniques related to a travel reservation system having a common object model for representing disparate travel products and services. In general, the common object model may be used to define various travel-related products and services, such that the definitions of the products and services are provider-independent within the system. A common model may be used to represent travel-related purchase order records, inventory definitions, and/or product availability. The use of a common object model may facilitate a single search across multiple different product types, such that the search will return results from different travel providers in different industry segments according to the search criteria—e.g., a single search may provide flight options, travel insurance, rental cars, and/or hotels.

Figure 1:
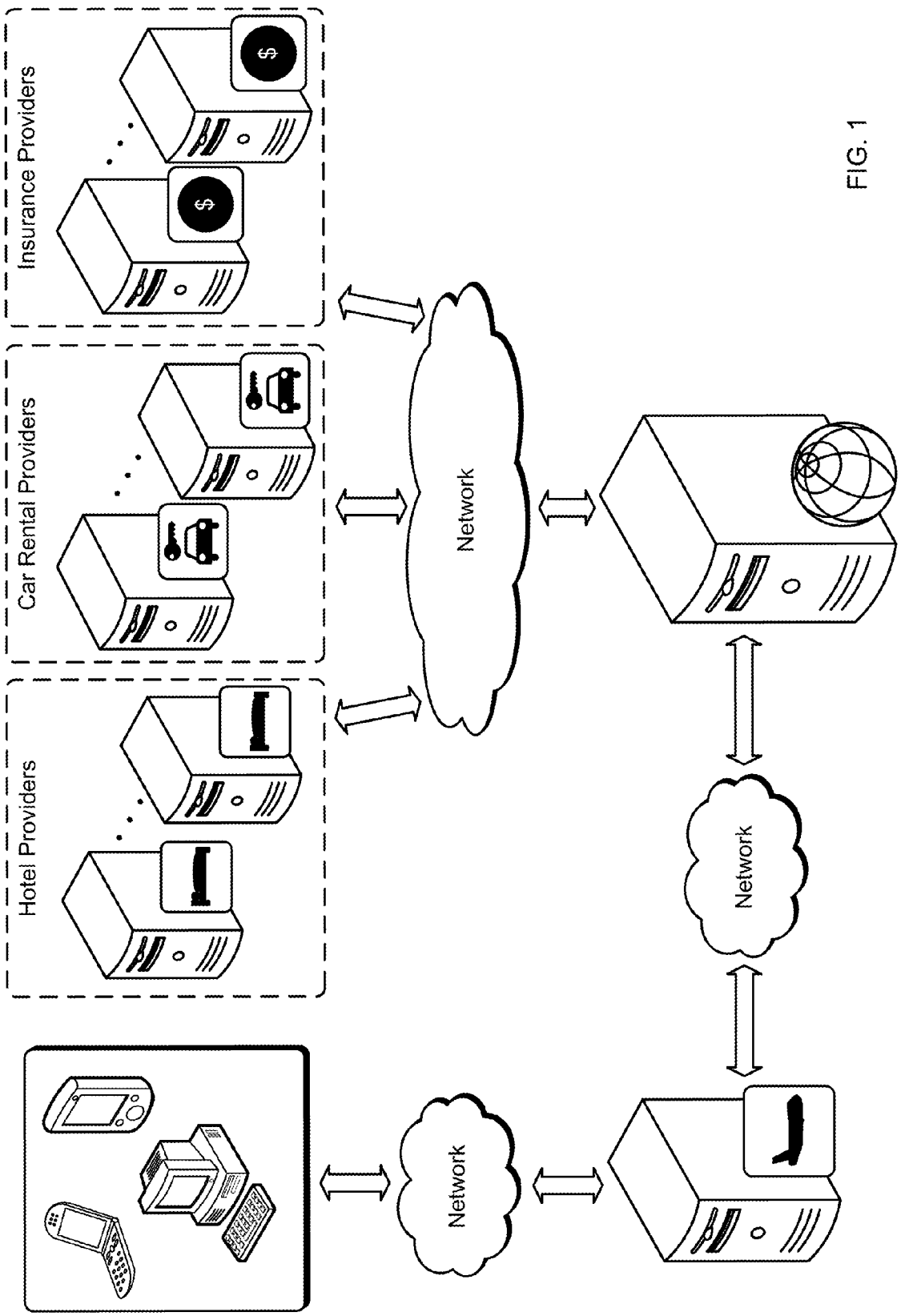
FIG. 1 is a conceptual diagram of a representative distributed network of travel providers.

FIG. 1 is a conceptual diagram of a representative distributed network of travel providers. The network may provide for communications between a customer and a customer-selected travel provider; between the customer-selected travel provider and a travel reservation system, and between the travel reservation system and one or more third-party travel providers.

The distributed network may allow a customer, for example, to access a selected travel provider, such as by logging in to an airline website to view available flights from Dallas to San Francisco. While the customer is selecting flight options, the airline provider may also provide third-party travel-related products or services that may be of interest to the customer. For example, if the customer is booking a weekend trip to San Francisco, the customer may also be interested in booking a hotel for the weekend, renting a car, going to a Giants game or a tour of Alcatraz, and/or purchasing travel insurance, etc. Since the airline provider may not offer these services directly, it may rely upon a travel reservation system to reach out to various third-party travel providers to identify available products and services that the airline provider may then display as options to the customer.

The network may include one or more users of the system, such as customers wishing to purchase travel-related products or services. These users can use any type of appropriate device to connect to a selected travel provider, such as a desktop computer, a laptop computer, a PDA, a cell phone, or the like. Although the example above uses an airline provider as the selected travel provider, the customer-selected travel provider may be any travel provider that is configured to interface with the travel reservation system as described herein. As such, rather than initially accessing an airline provider for the example trip from Dallas to San Francisco, the customer may instead reach out to a specific hotel in San Francisco for booking a hotel room, and the hotel provider may in turn access available flight options from one or more third-party airline providers via the travel reservation system. In some implementations (not shown in FIG. 1), the customer may also be able to directly connect to the travel reservation system.

The customer-selected travel provider may provide a user interface for the customer, such as an airline booking website. The interface may be hosted on a web server, for example, that allows customers to locate, select, and purchase one or more travel-related products or services. The selected travel provider may be communicably coupled to the travel reservation system via a communications network, which may be made up of any appropriate communications channels, either alone or in combination, such as the Internet, a local area network (LAN), a wide area network (WAN), a wired or wireless network, or the like.

The travel reservation system may provide the selected travel provider with additional travel-related products or services from third-party travel providers. The customer-selected travel provider may be any travel provider that is configured to communicate with the travel reservation system. In some implementations, if the customer-selected travel provider is part of a particular travel industry segment (e.g., the air travel segment), then the travel reservation system may not be configured to communicate with other third-party travel providers within the same segment (e.g., other airlines). Alternatively, other third-party travel providers even within the same segment may be included in the group of third-party travel providers that are in communication with the travel reservation system. For example, if a customer is booking a flight for a particular destination that is not directly serviced by the selected airline provider, the airline provider may wish to offer a flight segment from the customer's departure location to a connection point, and the travel reservation system may be used to find flight segments on a different third-party airline provider from the connection point to the final destination.

With reference to FIG. 1, the various third-party travel providers are shown grouped according to industry segment, e.g., hotel providers, car rental providers, and insurance providers. These industry segments are depicted as groups only for purposes of clarity, and are not meant to imply or require any logical, physical, or spatial grouping of the travel providers. In some implementations, each third-party travel provider is a separate entity that is separately, communicably coupled to the travel reservation system. Alternatively, some of the third-party travel providers may be communicably coupled to the travel reservation system in one or more groups.

The interfaces provided by the various third-party travel providers for accessing availability, pricing, order, and other information are typically provider-specific, such that the entity accessing the information needs to understand the specific data structures and functions that are exposed by the interface. For example, each of a number of different car rental providers (e.g., AVIS, HERTZ, etc.) may have its own provider-specific interface for communicating with the entity. As such, if the entity wishes to access multiple providers, for example to search for a mid-size sedan across several different car rental companies, the entity must understand how each of those interfaces is configured, and must be able to interpret the returned data according to the object models utilized by each of the different providers.

The travel reservation system may provide a single point of entry into the multiple third-party travel providers, and may utilize a common object model to represent the data from the providers, regardless of the product type. As such, an entity as described above that wishes to access multiple providers to identify a mid-size sedan across several different car rental companies may provide a request to the travel reservation system to identify available inventory meeting that criteria, and the system may provide the available products back to the entity using a conforming common model. The common model is used to define products across all product types, and therefore, the requesting entity only needs to understand a single product definition to be able to interpret the results from the travel reservation system.

The travel reservation system may also utilize a common data model to store and update information related to the various disparate product types that it encounters. For example, a car rental object may include all of the same elements and attributes as a flight object, a hotel object, etc. The same object model may also be used to represent travel-related services such as insurance, activities, etc.

In some implementations, each of the travel providers may have its own object models for the products and services offered. When these provider-specific objects are received by the travel reservation system, they may be translated or converted into objects that conform with the common model. For example, certain provider-specific data fields may be mapped to an appropriate common model data field, and certain provider-specific attributes may be mapped to an appropriate common model attribute, etc. These mappings may be accomplished, for example, via a translation table, substitution algorithms, or other appropriate techniques. By utilizing common data models across product types, the travel provider accessing the travel reservation system only needs to understand the data model for a single object, regardless of the product type being queried.

The common model framework of the travel reservation system allows for the use of a common set of functions to access the features of disparate travel-related products. In a provider-specific model where each travel provider's objects are different, the functions and parameters for calling a basic procedure to identify the price of the same class of hotel room may all be different (e.g., Get.MaxPrice.Room (Type5); Return.Room.Rate (DeluxeSuite); or Identify.Suite.Price (LargeSuite). In the common model, those parameters and functions may look the same to a system accessing those features. For example, to obtain room quotes for a Deluxe Suite (or equivalent), the common function accessible via a travel reservation system API may be QuoteItem (DeluxeSuite), regardless of the hotel providers that are being queried. The same function may similarly be used for all different product types—e.g., to obtain a quote for a mid-size sedan from any rental car company, the common function may be QuoteItem (MidSedan). By utilizing common functions across product types, the travel provider accessing the travel reservation system only needs to understand a single set of functions, regardless of the product type being queried.

Figure 2:
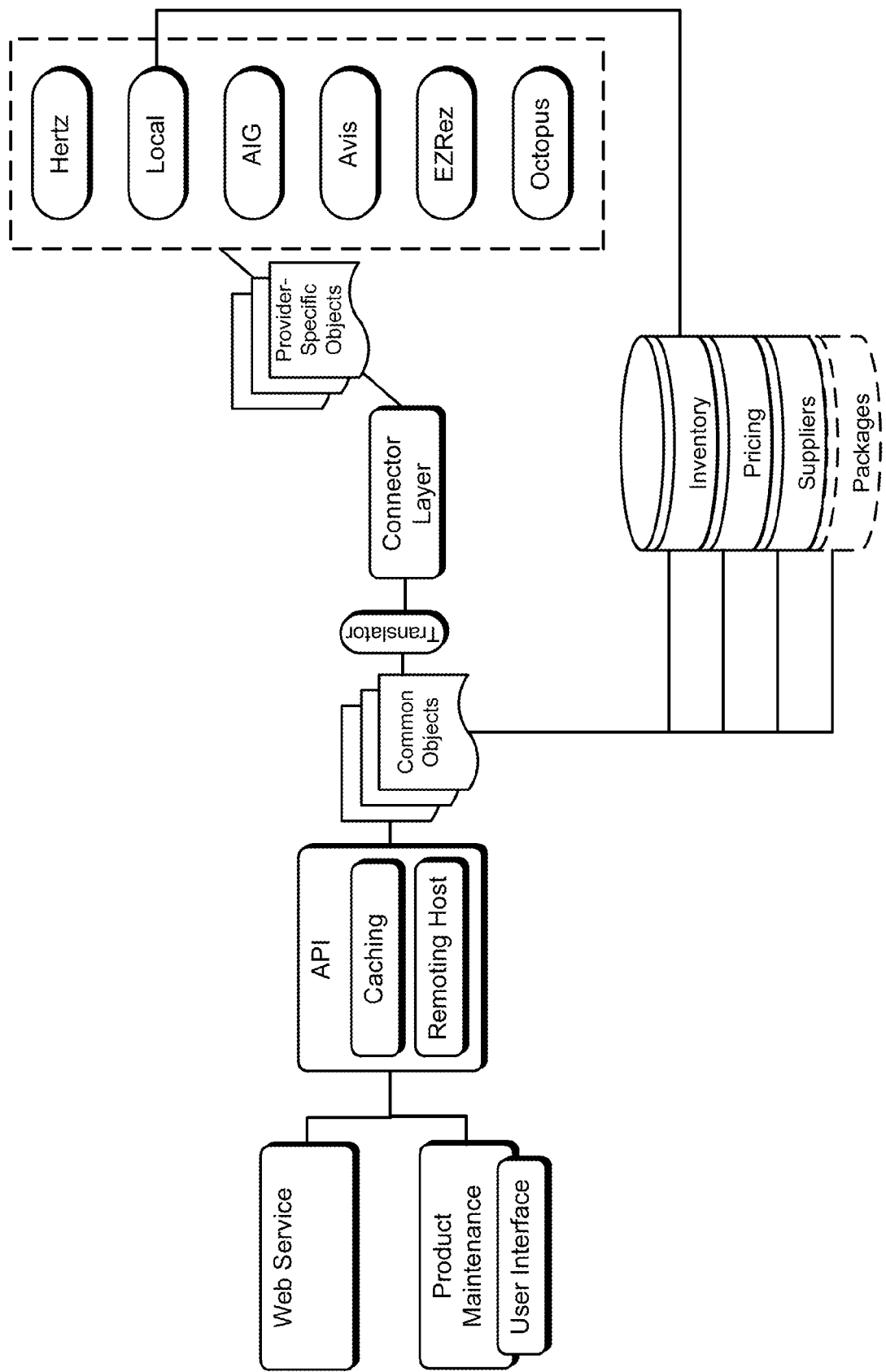
FIG. 2 is a block diagram of representative components of a travel reservation system.

FIG. 2 is a block diagram of representative components of a travel reservation system, such as the travel reservation system described with respect to FIG. 1. The travel reservation system may be accessible by one or more travel providers via a web service running on a hosted web server, with the web service creating an entry point to the travel reservation system for the remote travel provider systems. For example, an airline travel provider may wish to use the functionality of the travel reservation system to provide additional third-party travel products and/or services to its customers, and may remotely access the web service of the travel reservation system through known protocols.

The web service may expose an interface to the travel provider system, such as via an application programming interface (API) that provides functionality for the common object model. In some implementations, the functionality provided by the API is shared across disparate product types, such that the travel providers are exposed to a common set of functions, whether they are requesting information related to cars, hotels, insurance, or any combination thereof.

The API may be used to call or create instances of various travel product objects. As described above, the travel product definitions used in the travel reservation system may conform to a common object model, such that they all share common functionality via common methods and common data structures via common attributes. For example, a hotel product would have the same attributes as a car rental product, an activity product, or an insurance product, etc. Some of the attributes may be broadly applicable and used exactly the same across all different product types (e.g., a currency code attribute relating to the currency being used to express the cost of the product may always mean the same thing, regardless of the type or product), while other attributes may have different meanings, depending on the context of the product (e.g., a usage date attribute that, for an insurance product means the effective date of the insurance, but for an activity product means the date that the activity has been scheduled to be used).

The travel reservation system may also include one or more databases to store data relating to the travel products and services available through the system. In some implementations, the system may include separate databases for inventory, pricing, suppliers, and/or packages, for example. Data relating to the travel products may be stored in these or other appropriate databases in their native, non-translated common model form. For example, an inventory database may store data related to whether a certain product is available or not available, and if so, whether there is a limit on how many of those products are available (e.g., the inventory of car rentals may include how many intermediate-class sedans are available for rental at any given location on a particular date). As another example, a pricing database may store data related to the price of various products (e.g., a hotel provider may charge a certain amount for a particular type of room, on a particular category of day, such that a premium room may be priced at $200 during the week during a down-period, while the same premium room may be $275 on the weekend). In another example, a packages database may store groupings of multiple different product types or categories as a package (e.g., a particular customer may wish to package multiple travel-related products together, such as a flight, a hotel room, a rental car, etc.). In some implementations, such packages may be stored in the common model format, such that packages of products and/or services may be treated similarly to other common model objects as described herein.

In some implementations, a translation module may be used to translate the travel product objects of the travel reservation system into travel product objects that are recognizable to various third-party travel providers, and vice versa. For example, certain provider-specific data fields may be mapped to an appropriate common model data field, and certain provider-specific attributes may be mapped to an appropriate common model attribute, etc. These mappings may be accomplished, for example, via a translation table, substitution algorithms, or other appropriate techniques. The translation module may be configurable to adapt to the various provider-specific product models as they change over time.

The travel reservation system may also include a connector layer to provide one or more connectors, each of which may correspond to a particular third-party travel provider or travel service aggregator. The connectors, which may be implemented as third-party APIs or any other appropriate programming interface, operate as interfaces to the third-party systems to allow communication between the travel reservation system and the third-party systems. For example, a particular car rental provider, such as HERTZ, may expose functionality to the travel reservation system that is different than that exposed by a different car rental provider, such as AVIS. Similarly, the exposed functionality for the two systems may be similar or even identical, but the third-party systems may use different function names or different input parameters to those functions. As such, depending on which travel provider is being accessed, the travel reservation system may use a different connector, corresponding to the appropriate travel provider.

The travel reservation system may also include a product maintenance application, which may have a user interface. In some implementations, a product administrator or other appropriate user may use the interface to add, update, or delete products or services from the travel reservation system. In some implementations, the product administrator may also use the interface to add, update, or delete product variations, product inventory, and/or product rates associated with particular products.

In general, the product maintenance application may be used to define or modify the attributes included in the common object model related to products and services available through the reservation system. Some of the attributes may be system defined and/or automatically updated or added based on application parameters, while other attributes may be editable by a user.

Figure 3:
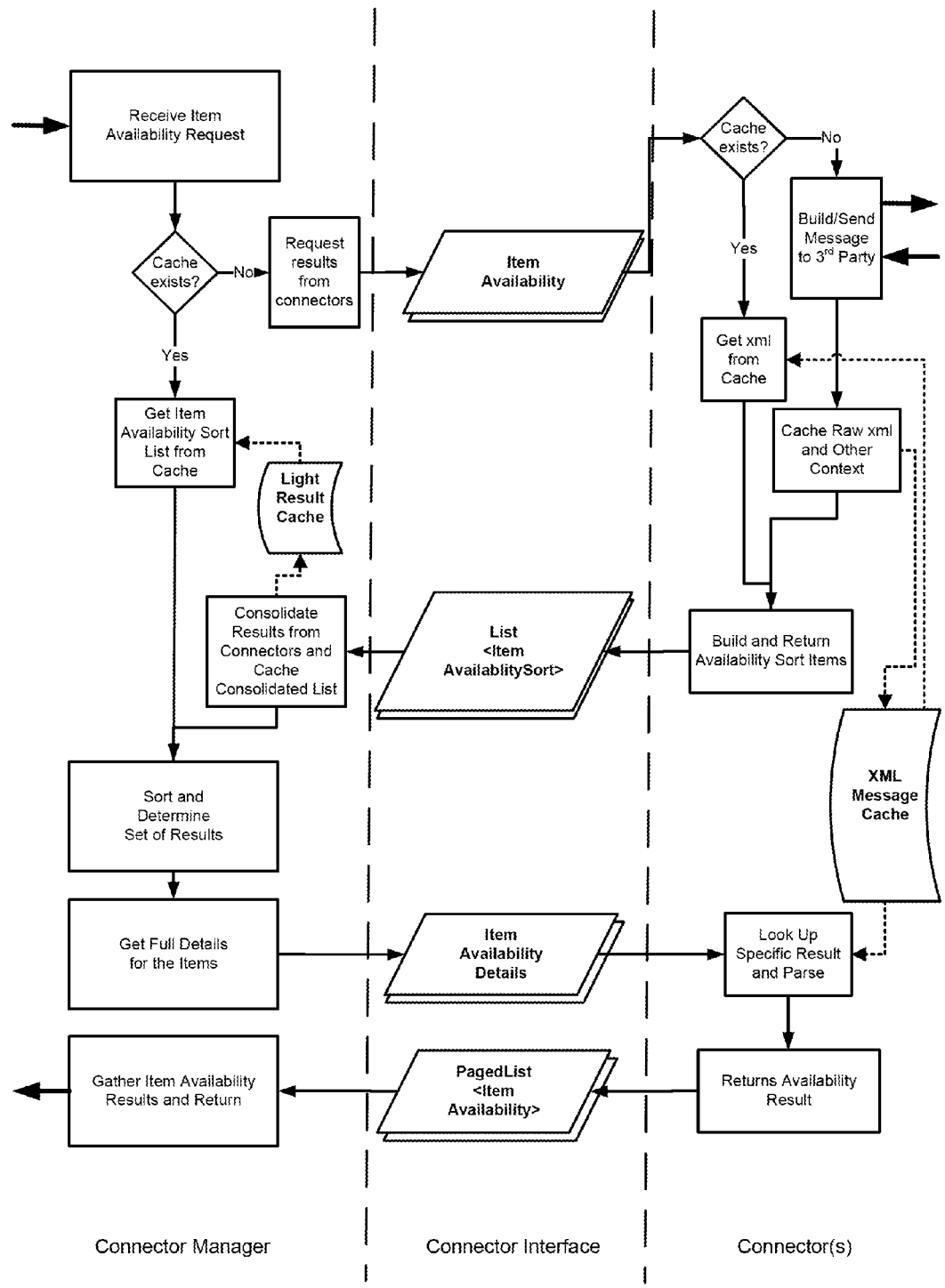
FIG. 3 is a flow chart of an example process for retrieving travel product availability.

FIG. 3 is a flow chart of an example process for retrieving travel product availability. In the process, the travel reservation system may receive an item availability request from an initiating travel provider to identify whether various third-party products or services are available. The request may include certain criteria describing the types of products or services that are being requested. In some implementations, the request may be generated by the initiating travel provider in response to a customer request—e.g., a customer purchasing a flight from the travel provider may select an option available from the initiating travel provider to show hotel rooms corresponding to the customer's travel plans. In other implementations, the initiating travel provider may request product availability on its own in anticipation of the customer requesting such related products, or to provide the customer with third-party travel options that correspond to the customer's travel preferences, for example.

After the availability request is received, the travel reservation system may create and send queries to one or more third-party providers to identify the available products and services corresponding to the requested criteria. After the available products and services have been identified, they may be provided to the initiating travel provider, such that they may be displayed to the customer.

As described above, the communications with the third-party providers may be conducted either in the native common object model format described herein, or in the provider-specific format used by each third-party travel provider. In some implementations where the provider-specific format is used for communication, the travel reservation system may include one or more translation modules to translate the objects from the native common object model to the provider-specific format, and vice versa.

The flow chart also includes other processing and/or functionality that may be utilized in some implementations, such as result caching, result consolidation, sorting, and retrieval of additional details, for example.

Figure 4:
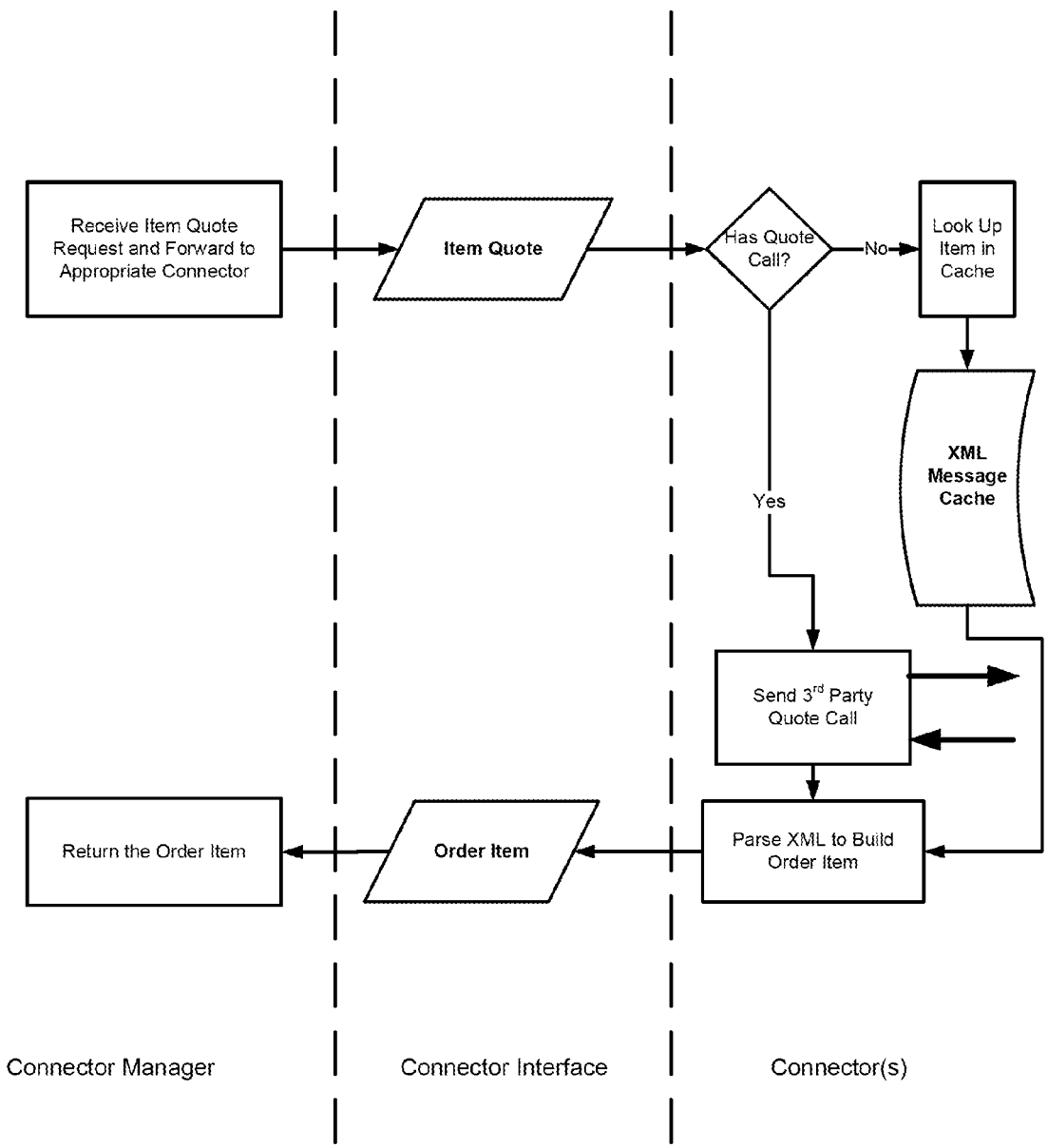
FIG. 4 is a flow chart of an example process for retrieving a travel product quote.

FIG. 4 is a flow chart of an example process for retrieving a travel product quote. In the process, the travel reservation system may receive an item quote request from an initiating travel provider to identify a quoted price for one or more third-party products or services. In some implementations, the request may be generated by the initiating travel provider in response to a customer request—e.g., a customer purchasing a flight from the travel provider may select a hotel room corresponding to the customer's travel plans, and may request a firm quote for the room. In other implementations, the initiating travel provider may request product quotes on its own in anticipation of the customer requesting such related products, or to provide options at particular price points that may be of interest to the customer, for example.

After the quote request is received, the travel reservation system may create and send queries to one or more third-party providers to identify one or more quotes corresponding to the request. After the quotes have been identified, they may be provided to the initiating travel provider, such that they may be displayed to the customer.

FIGS. 5A-5D are example screen shots of a user interface for maintaining travel products and/or services. The user interface may be part of a product maintenance application, as described with respect to FIG. 2. In some implementations, a product administrator or other appropriate user may use the interface to add, update, or delete products or services from the system. In some implementations, the product administrator may also use the interface to add, update, or delete product variations, product inventory, and/or product rates associated with particular products.

In general, the user interface allows the user to define or modify many of the attributes included in the common object model related to products. Some of the attributes may be system defined rather than user defined, such as a product creation date that may or may not be editable by the user. Depending on the particular object model utilized, the user interface may include different options and/or functionality. As such, variations of the user interface described herein and depicted in FIGS. 5A-5D are contemplated.

The user interface may include a product search panel that allows the user to search within the system for defined products using one or more search criteria. The user interface may also include a products section that allows the user to add, edit, and/or delete products in the system. For example, the user may add a product to the system by defining its status, code, name, type, provider, or other similar attributes. After it has been added, a product can also be either modified or deleted via the interface. The user interface may also include a product variations section that allows the user to add, edit, and/or delete product variations. For example, the user may create a variation of an already defined product by defining the variation's variation identifier, variation name, external SKU, or the like.

The user interface may also include a product inventory section that allows the user to add, modify, or delete available inventory in the system, such as by defining the maximum quantity of the product that is available, what dates the product is available, the number of products that have been sold, etc.

The user interface may also include a product rate section that allows the user to add, modify, or delete prices, rates, and/or taxes associated with a particular product. The rates may be defined for particular dates or seasons, for particular sales channels, for particular product variations, etc.

Figure 6:
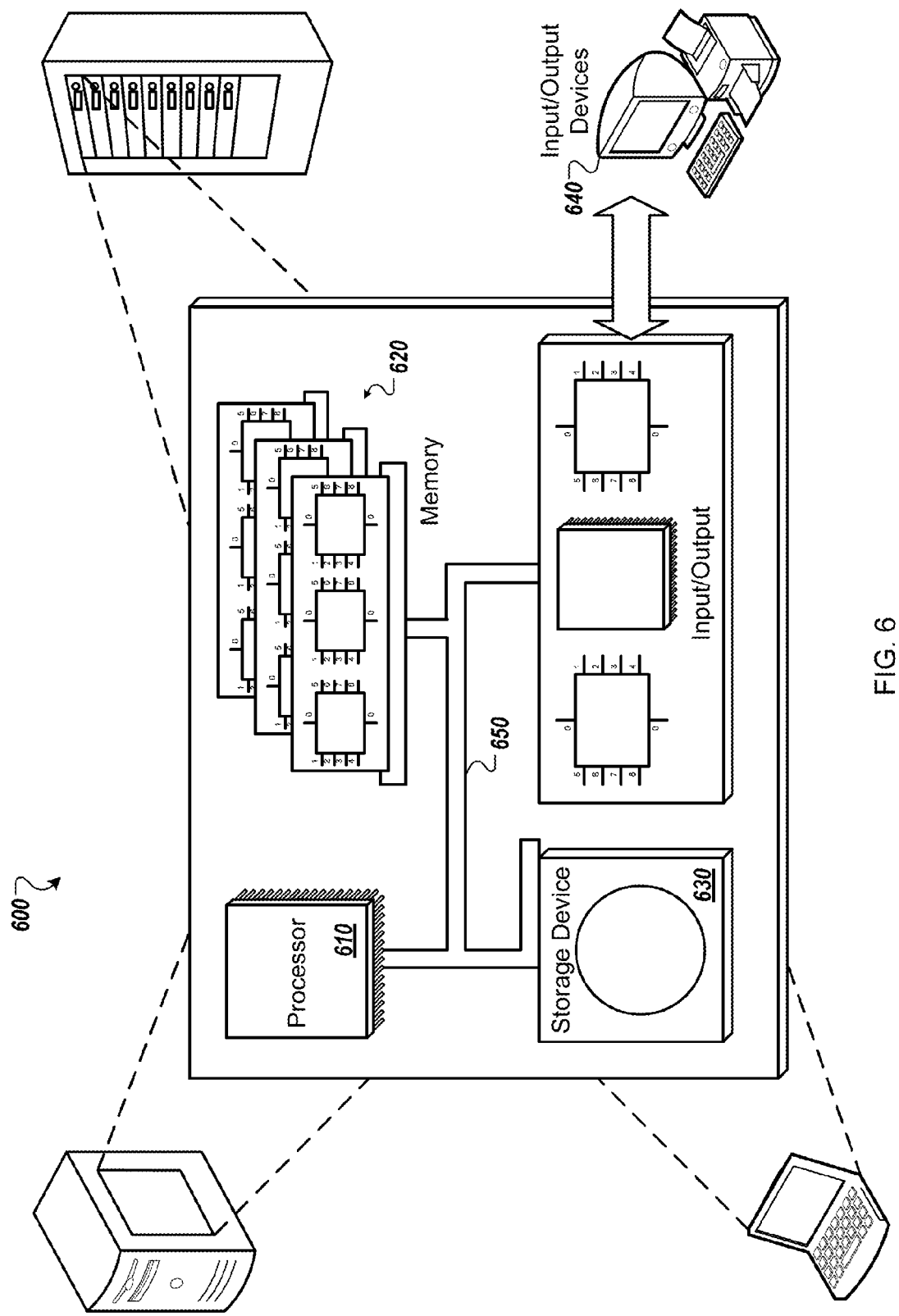
FIG. 6 shows an example of a computer device that can be used to implement the techniques described herein.

FIG. 6 is a schematic diagram of a computer system 600. The system 600 can be used for the operations described in association with any of the computer-implement processes described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and process steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, other steps may be provided, or steps may be eliminated, from the described flows, and other components may be added to, or removed from, the described systems. Accordingly, other implementations are within the scope of the following claims.

The invention claimed is:

1. A computer-implemented method comprising:
receiving, by a travel reservation system, an item availability request from an initiating travel provider providing a first type of travel item requested by a user, the travel reservation system providing a single point of entry for third party travel item providers,
the item availability request specifying a single search to be performed by the travel reservation system using one or more criteria describing both other types of travel items that are different from the first type of travel item requested by the user and other travel items that are of the first type but not serviceable by the initiating travel provider, and
the item availability request being generated by the initiating travel provider in response to a search request received from the user by the initiating travel provider for the first type of travel item so as to provide the user with information regarding one or more of the other types of travel items for use in connection with a trip involving the first type of travel item;

translating, by one or more computer processors of the travel reservation system, the one or more criteria to provider-specific criteria to create provider-specific queries for the third party travel item providers using a common object model that defines objects as provider-independent or provider-specific within the travel reservation system, the common object model comprising a set of common functions that provide a same functionality to the third party travel item providers accessing the travel reservation system at the single point of entry, the objects comprising one or more common attributes that are applied in a same manner to all types of travel items and one or more variable attributes that are applied in a different manner to different types of travel items, depending on the context of the travel items;

transmitting the provider-specific queries from the travel reservation system to the third party travel item providers requesting information regarding available travel items that satisfy the one or more criteria;

receiving, by the travel reservation system, the information from the third party travel item providers regarding the available travel items that satisfy the one or more criteria, the information regarding the available travel items having formats specific to the third party travel item providers;

translating, by the one or more computer processors of the travel reservation system, the information received from the third party travel item providers into information having a provider-independent format that conforms with the common object model, the translating the information received from the third party travel item providers comprising mapping provider-specific data fields to common object model data fields utilized by the set of common functions;

storing, in one or more travel product databases of the travel reservation system, the information having the provider-independent format such that the information having the provider-independent format can be processed according to the common object model;

receiving, from a product administrator, an inventory of one or more additional travel items and product variations associated with the one or more additional travel items, the one or more additional travel items and the product variations defined according to the provider-independent format that conforms with the common object model; and transmitting the information received from the third party travel item providers with the provider-independent format, and additional information regarding one of the additional travel items and a product variation associated with the one of the additional travel items, from the travel reservation system to the initiating travel provider for presentation by the initiating travel provider to the user.

2. The method of claim 1, wherein the item availability request is generated in response to a query received from the user requesting the first type of travel item.

3. The method of claim 1, wherein translating comprises mapping provider-specific attributes to common object model attributes.

4. The computer-implemented method of claim 1, wherein the item availability request comprises an item quote request.

5. The computer-implemented method of claim 1, wherein translating the one or more criteria to the provider-specific criteria is based on models of the provider-specific criteria that are changeable over time.

6. The computer-implemented method of claim 1, wherein the objects defined as provider-independent objects are updated based on product maintenance parameters of the travel reservation system.

7. A travel reservation system comprising:
one or more receivers that are configured to perform operations comprising:
receiving item availability requests from initiating travel providers providing a first type of travel item requested by a user, the travel reservation system providing a single point of entry for third party travel item providers,
the item availability requests specifying a single search to be performed by the travel reservation system using one or more criteria describing both other types of travel items that are different from the first type of travel item requested by the user, and other travel items that are of the first type but not serviceable by the initiating travel provider, and
the item availability requests being generated by the initiating travel providers in response to search requests received from the user by the initiating travel provider for the first type of travel item so as to provide the user with information regarding one or more of the other types of travel items for use in connection with a trip involving the first type of travel item,
receiving information from the third party travel item providers regarding available travel items that satisfy the one or more criteria of the item availability requests, the information regarding the available travel items having formats specific to the third party travel item providers, and
receiving, from a product administrator, an inventory of one or more additional travel items and product variations associated with the one or more additional travel items;
one or more processors that are configured to perform operations comprising:
translating the one or more criteria to provider-specific criteria to create provider-specific queries for the third party travel item providers using a common object model that defines objects as provider-independent or provider-specific within the travel reservation system, the common object model comprising a set of common functions that provide a same functionality to the third party travel item providers accessing the travel reservation system at the single point of entry, the objects comprising one or more common attributes that are applied in a same manner to all types of travel items and one or more variable attributes that are applied in a different manner to different types of travel items, depending on the context of the travel items, and the one or more additional travel items and the product variations defined according to a provider-independent format that conforms with the common object model, and
translating the information received from the third party travel item providers into information having the provider-independent format that conforms with the common object model, the translating the information received from the third party travel item providers comprising mapping provider-specific data fields to common object model data fields utilized by the set of common functions;

one or more travel product databases that store the information having the provider-independent format such that the information having the provider-independent format can be processed according to the common object mode; and one or more transmitters that are configured to perform operations comprising:

transmitting the provider-specific queries from the travel reservation system to the third party travel item providers requesting the information regarding the available travel items that satisfy the one or more criteria of the item availability requests, and transmitting the information received from the third party travel item providers with the provider-independent format, and additional information regarding one of the additional travel items and a product variation associated with the one of the additional travel items, from the travel reservation system to the initiating travel providers for presentation by the initiating travel providers to the user.

8. The system of claim 7, wherein the item availability requests are generated in response to a query received from the user requesting the first type of travel item.

9. The system of claim 7, wherein translating comprises mapping provider-specific attributes to common object model attributes.

10. The system of claim 7, wherein the item availability requests comprise item quote requests.

11. The travel reservation system of claim 7, wherein the one or more processors translate the one or more criteria to the provider-specific criteria based on models of the provider-specific criteria that are changeable over time.

12. The travel reservation system of claim 7, wherein the objects defined as provider-independent objects are updated based on product maintenance parameters of the travel reservation system.

13. A non-transitory computer-readable storage medium having a computer program product stored thereon, the computer program product including instructions that, when executed by one or more processors of a travel reservation system, cause the one or more processors to perform operations comprising:

receiving an item availability request from an initiating travel provider providing a first type of travel item requested by a user, the travel reservation system providing a single point of entry for third party travel item providers, the item availability request specifying a single search to be performed by the travel reservation system using one or more criteria describing both other types of travel items that are different from the first type of travel item requested by the user, and other travel items that are of the first type but not serviceable by the initiating travel provider, and the item availability request being generated by the initiating travel provider in response to a search request received from the user by the initiating travel provider for the first type of travel item so as to provide the user with information regarding one or more of the other types of travel items for use in connection with a trip involving the first type of travel item;

translating the one or more criteria to provider-specific criteria to create provider-specific queries for the third party travel item providers using a common object model that defines objects as provider-independent or provider-specific within the travel reservation system, the common object model comprising a set of common functions that provide a same functionality to the third party travel item providers accessing the travel reservation system at the single point of entry, the objects comprising one or more common attributes that are applied in a same manner to all types of travel items and one or more variable attributes that are applied in a different manner to different types of travel items, depending on the context of the travel items;

transmitting the provider-specific queries from the travel reservation system to the third party travel item providers requesting information regarding available travel items that satisfy the one or more criteria;

receiving the information from the third party travel item providers regarding the available travel items that satisfy the one or more criteria, the information regarding the available travel items having formats specific to the third party travel item providers;

translating the information received from the third party travel item providers into information having a provider-independent format that conforms with the common object model, the translating the information received from the third party travel item providers comprising mapping provider-specific data fields to common object model data fields utilized by the set of common functions;

storing, in one or more travel product databases of the travel reservation system, the information having the provider-independent format such that the information having the provider-independent format can be processed according to the common object model;

receiving, from a product administrator, an inventory of one or more additional travel items and product variations associated with the one or more additional travel items, the one or more additional travel items and the product variations defined according to the provider-independent format that conforms with the common object model; and transmitting the information received from the third party travel item providers with the provider-independent format, and additional information regarding one of the additional travel items and a product variation associated with the one of the additional travel items, from the travel reservation system to the initiating travel provider for presentation by the initiating travel provider to the user.

14. The non-transitory computer-readable storage medium of claim 13, wherein the item availability request is generated in response to a query received from the user requesting the first type of travel item.

15. The non-transitory computer-readable storage medium of claim 13, wherein translating comprises mapping provider-specific attributes to common object model attributes.

16. The non-transitory computer-readable storage medium of claim 13, wherein the item availability request comprises an item quote request.

17. The non-transitory computer-readable storage medium of claim 13, wherein translating the one or more criteria to the provider-specific criteria is based on models of the provider-specific criteria that are changeable over time.

18. The non-transitory computer-readable storage medium of claim 13, wherein the objects defined as provider-independent objects are updated based on product maintenance parameters of the travel reservation system.

* * * * *

UNITED STATES PATENT AND TRADEMARK OFFICE
CERTIFICATE OF CORRECTION

PATENT NO. : 9,922,382 B2
APPLICATION NO. : 12/872688
DATED : March 20, 2018
INVENTOR(S) : Martin J. Drefs et al.

Page 1 of 1

It is certified that error appears in the above-identified patent and that said Letters Patent is hereby corrected as shown below:

In the Claims

Column 13, Claim 7, Line 11, change "mode" to --model--

Signed and Sealed this
First Day of May, 2018

Andrei Iancu
*Director of the United States Patent and Trademark Office*